United States Patent [19]

McCarthy

[11] Patent Number: 6,011,970
[45] Date of Patent: Jan. 4, 2000

[54] METHOD AND SYSTEM FOR ASSURING NEAR UNIFORM CAPACITY AND QUALITY OF CHANNELS IN CELLS OF WIRELESS COMMUNICATIONS SYSTEMS HAVING CELLULAR ARCHITECTURES

[75] Inventor: Michael John McCarthy, University Park, Tex.

[73] Assignee: Nortel Networks Corporation, Montreal, Canada

[21] Appl. No.: 08/899,348

[22] Filed: Jul. 23, 1997

[51] Int. Cl.[7] ...................................................... H04Q 7/20
[52] U.S. Cl. .......................... 455/436; 455/67.3; 455/439; 455/513
[58] Field of Search ...................................... 455/436, 439, 455/438, 63, 67.3, 513; 370/332, 333

[56] References Cited

U.S. PATENT DOCUMENTS

| | | | |
|---|---|---|---|
| 4,570,899 | 2/1986 | Brody et al. | 455/426 |
| 5,161,249 | 11/1992 | Meche et al. | 455/562 |
| 5,175,867 | 12/1992 | Wejke et al. | 455/439 |
| 5,203,010 | 4/1993 | Felix et al. | 455/438 |
| 5,204,970 | 4/1993 | Stengel et al. | 455/63 |
| 5,579,373 | 11/1996 | Jang | 455/436 |
| 5,594,949 | 1/1997 | Andersson et al. | 455/437 |
| 5,701,585 | 12/1997 | Kallin et al. | 455/437 |
| 5,805,995 | 10/1996 | Jiang et al. | 455/439 |
| 5,822,699 | 6/1996 | Kotzin et al. | 455/447 |

*Primary Examiner*—Edward F. Urban
*Assistant Examiner*—Tilahun Gesesse
*Attorney, Agent, or Firm*—John D. Crane; Andrew J. Dillon

[57] ABSTRACT

A method and system for use with wireless communication systems having a cellular architecture with at least a first and a second cell. The method and system provided ensure near uniform capacity and quality of channels within the second cell via the following steps. The noise signal power in unused data channels within the second cell is monitored. When a request for channel access is received, a determination is made whether the request for channel access is either a request for handoff from the first cell into the second cell, or not. In the event that the request is not a request for handoff, a determination is made whether idle channels exist to satisfy the request for channel access. In the event of a determination either that the request for channel access is a request for handoff, or both that the request is not a request for handoff and that idle channels exist to satisfy the request, a measured received signal power of a mobile unit subscriber unit making the request is determined. One of the unused channels in the second cell is then preferentially assigned to the mobile subscriber unit where such preference in assigning is to assign a channel, provided that a signal to noise ratio calculated upon the monitored received signal power and the monitored noise signal power of the preferentially assigned noisy channel meets or exceeds a required signal to noise ratio.

24 Claims, 10 Drawing Sheets

Cell Cluster of Size 7
Wherein No
Frequencies Are Reused

METHOD AND SYSTEM FOR ASSURING NEAR UNIFORM CAPACITY AND QUALITY OF CHANNELS IN CELLS OF WIRELESS COMMUNICATIONS SYSTEMS HAVING CELLULAR ARCHITECTURES

BACKGROUND OF THE INVENTION

1. Technical Field

The present invention relates, in general, to an improved method and system to be utilized with wireless communication systems having cellular architectures. In particular, the present invention relates to an improved method and system, to be utilized with wireless communication systems having cellular architectures, and which ensure near uniform capacity and quality of channels within each cell. Still more particularly, the present invention relates to an improved method and system, to be utilized with wireless communication systems having cellular architectures, and which ensure near uniform capacity and quality of channels within each cell by taking the measured received signal strength of mobile subscriber units into account when assigning relatively noisy and relatively noise free channels to mobile subscriber units either during handoff from other cells into a current cell or in response to a request for call access originating in a current cell.

2. Description of the Related Art

The present invention is related to wireless communication systems, and, in particular, to wireless communications systems having a cellular architecture (e.g., cellular telephony, Personal Communications Systems, or Global Systems for Mobil Communication). Wireless communication refers to the fact that transmission between sending and receiving stations occurs via electromagnetic radiation not guided by any hard physical path (e.g., by microwave link). Cellular architecture refers to the fact that the wireless system effects service over an area by utilizing a system that can be pictographically represented as a cellular grid.

Wireless cellular communication is the latest incarnation of a technology that was originally known as mobile telephone systems. Early mobile telephone system architecture was structured similar to television broadcasting. That is, one very powerful transmitter located at the highest spot in an area would broadcast in a very large radius. If a user were in the useable radius, then that user could broadcast to the base station and thus communicate by radiotelephone to the base station. However, such systems proved to be very expensive for the users and not very profitable to the communications companies maintaining such systems. The primary limiting factor of the original mobile telephone systems was that the number of channels available for use was limited due to severe channel-to-channel interference within the area served by the powerful transmitter. Thus, a problem arose as to how to provide more channels within the service area.

Counterintuitively, engineers discovered that channel-to-channel interference effects within the service area were not solely due to the distance between stations communicating with the base transmitter (which intuitively would seem to give rise to the interference), but were also inversely related to the transmitter power (radius) of the area being served by the transmitter. Engineers found that by reducing the radius of an area being served by fifty percent, service providers could increase the number of potential customers in an area fourfold. It was found that systems based on areas with a one-kilometer radius would have one hundred times more channels than systems with areas ten kilometers in radius. Speculation led to the conclusion that by reducing the radius of areas to a few hundred meters, the number of calls that could be served by each cell could be greatly increased.

Thus, reducing the power of the central transmitter allowed a significant increase in the number of available channels by reducing channel-to-channel interference within an area. However, as the power of the central transmitter was reduced, the serviceable area was also reduced. Thus, although reducing transmission power increased the number of available channels, the small service area provided by such reduced power did not make such radio telephone systems attractive communications options for many users. Thus, a problem arose relating to how to utilize the discovery that smaller cell sizes increased available channels in a fashion that would provide service attractive to users.

This problem was solved by the invention of the wireless cellular architecture concept. The wireless cellular architecture concept utilizes geographical subunits called "cells" and is buttressed by what is known as a frequency reuse concept. A cell is the basic geographic unit of a cellular system. Cells are base stations (a base station consists of hardware located at the defining location of a cell and includes power sources, interface equipment, radio frequency transmitters and receivers, and antenna systems) transmitting over small geographic areas that are represented as hexagons. Each cell size varies depending on the landscape. The term "cellular" comes from the honeycomb shape of the areas into which a coverage region is divided. Because of constraints imposed by natural terrain and man-made structures, the true shape of cells is not a perfect hexagon, but such shape serves as an effective tool for design engineering.

Within each cell a base station controller talks to many mobile subscriber units at once, using one defined transmit/receive communications channel per mobile subscriber unit. A mobile subscriber unit (a control unit and a transceiver that transmits and receives wireless transmissions to and from a cell site) uses a separate, temporary wireless channel to talk to a cell site. Transmit/receive communications channels use a pair of frequencies for communication—one for transmitting from the cell site base station controller, named the forward link, and one frequency for the cell site to receive calls from the users, named the reverse link. Both the forward and reverse link must have sufficient bandwidth to allow transmission of user data.

The frequency reuse concept is what made wireless cellular communications a viable reality. Wireless communication is regulated by government bodies (e.g., the Federal Communications Commission). Government bodies dictate what frequencies in the wireless spectrum can be utilized for particular applications. Consequently, there are is a finite set of frequencies available for use with wireless cellular communications. The frequency reuse concept is based on assigning to each cell a group of radio channels utilized within a small geographic area (cell). Adjacent cells are assigned a group of channels that is completely different from any neighboring cell. Thus, in the frequency reuse concept there is always a buffer cell between two cells utilizing the same set of frequencies. The cells are sized such that it is not likely that two cells utilizing the same set of frequencies will interfere with each other. Thus, such a scheme allows "frequency reuse" by non-adjacent cells.

Since each contiguous cell utilizes different frequencies, the ability for such a system to supply continuous service across a cell grid requires that a call-in-progress be switched to a new transmit/receive channel as a user transits from one cell into another. That is, since adjacent areas do not use the same wireless channels, a call must either be dropped or transferred from one wireless channel to another when a user crosses the line between adjacent cells. Because dropping the call is unacceptable, the process of "handoff" was created. Handoff occurs when the mobile telephone network automatically transfers a call from one wireless channel to another wireless channel as a mobile subscriber unit crosses adjacent cells.

Handoff works as follows. During a call, a moving mobile subscriber unit is utilizing one channel. When the mobile unit moves out of the coverage area of a given cell site, the reception becomes weak. At this point, the base station controller in use requests a handoff. The system switches the call to another different frequency channel in a new cell without interrupting the call or alerting the user. The call continues as long as the user is talking, and generally the user barely notices the handoff.

The foregoing ideas of cells, frequency reuse, and handoff constituted the invention of the cellular concept. The invention of the cellular concept made the idea of wireless cellular communications a viable commercial reality.

The first large scale wireless communication system utilizing cellular architecture in North America was the Advanced Mobile Phone Service (AMPS) which was released in 1983. AMPS utilizes the 800-MHz to 900-MHz frequency band and the 30 KHz bandwidth for each transmit/receive channel as a fully automated mobile telephone service. Designed for use in cities, AMPS later expanded to rural areas. It maximized the cellular concept of frequency reuse by reducing radio power output. AMPS is utilized throughout the world and is particularly popular in the United States, South America, China, and Australia. AMPS uses frequency modulation (FM) for radio transmission. In the United States, transmission between the mobile and the base station uses separate frequencies on the forward and reverse links.

With the introduction of AMPS, user demand for bandwidth was initially slow until users became acquainted with the power of such a system. However, once users became acquainted with the power of cellular, the demand for the service exploded. Very quickly, even the extended number of channels available utilizing the cellular concepts of reduced power output and frequency reuse were quickly consumed. Users demanded yet more bandwidth, and a problem arose in the cellular industry.

Engineers responded to the problem by devising the Narrowband Analog Mobile Phone Service (NAMPS). In this second generation of analog cellular systems, NAMPS was designed to solve the problem of low calling capacity. In the NAMPS three transmit/receive channels are frequency division multiplexed into the AMPS 30-kHz single transmit/receive channel bandwidth. Frequency division multiplexing is the process of deriving two or more simultaneous, continuous channels from a propagation medium that connects two points by (a) assigning separate portions of the available frequency spectrum to each of the individual channels, (b) dividing the frequency range into narrow bands, and (c) using each narrow band as a separate channel. Weik, *Communications Standard Dictionary* 375 (3ed. 1995). NAMPS services three users in one AMPS transmit/receive channel by dividing the 30-kHz AMPS bandwidth into three transmit/receive 10-kHz channels.

Thus, NAMPS essentially tripled the capacity of AMPS. However, although NAMPS multiplied the capacity of AMPS, it also introduced significant adjacent channel interference effects. Users did not find such interference acceptable, which created a problem. The problem now was how to maintain the extended capacity of the NAMPS system, but without the interference effects.

This problem was more difficult, because at this point the engineers had pushed the limits of the analog channels of AMPS, via NAMPS, to their absolute data carrying capacity limits. Since the spectrum available to cellular was now being utilized as efficiently as possible, engineers had to find a new way to increase the bandwidth of AMPS, but without the adjacent channel interference introduced by NAMPS. They accomplished this by the overlaying of digital multiplexing technologies onto the analog channels available in AMPS, and NAMPS. Such overlaying schemes are generally referred to as Digital AMPS, or DAMPS. North American digital cellular is alternatively referred to as both DAMPS and TDMA. One of the technologies so overlaid is that of Time Division Multiple Access (TDMA).

Whereas frequency division multiplexing divides a transmit/receive channel into narrow frequency band transmit/receive channels so that more user data can be sent in the original transmit/receive channel, TDMA uses digital techniques to divide time access to an analog channel before users are even allowed to access the analog channel. TDMA uses digital signals and provides each call with time slots into which to insert digital data, so that several calls can occupy one bandwidth. Each caller is assigned a specific time slot. In some cellular systems, digital packets of information are sent during each time slot and reassembled by the receiving equipment into original signal components. TDMA uses the same frequency band and channel allocations as AMPS and NAMPS. Thus, such technology has extended the usable bandwidth of the AMPS to that of NAMPS, but has done so without the adjacent channel interference that is a byproduct of NAMPS.

Like NAMPS, TDMA provides three channels (i.e., supports three mobile subscriber units) in the same bandwidth as a single AMPS channel (that is, the analog transmission portion of TDMA is very similar to that of NAMPS). Unlike NAMPS, in TDMA digital signal processing is utilized to compress the spectrum necessary to transmit information by compressing idle time and redundancy of messages to be sent over a channel. Once such compressed data has been sent over a channel, sister digital processing equipment on the other end of the channel decompresses the signal. Such compression effectively allows more users to communicate over the bandwidth of AMPS.

AMPS, NAMPS and TDMA are currently being utilized in many parts of the world. AMPS and NAMPS both utilize handoff. Furthermore, since TDMA is digital multiplexing overlaid onto either AMPS or NAMPS, TDMA also utilizes handoff.

Thus, AMPS, NAMPS, and TDMA all utilize cellular architecture and some variant of the above described handoff mechanism. For reasons that will now be described, the currently utilized methods of assigning channels to mobile subscriber units during handoff are deficient in that they fail to utilize existing information in order to ensure near uniform capacity and quality of channels within a cell.

Within each cell, there appears a range of what can be characterized as relatively noisy channels to what can be characterized as relatively noise-free channels. Ordinarily, when a mobile subscriber unit transits from one cell to another cell, a channel selection algorithm inside the cell into which the mobile subscriber unit has transited assigns the mobile subscriber unit a channel on which to communicate while in the cell. The same channel selection algorithm also tends to be utilized to assign channels to mobile subscriber units in response to requests for channel access which are not handoff requests (e.g., requests for channel access originating internal to a cell). At present, these channel selection algorithms attempt to provide clear communications for users by assigning, on a first come first served basis, relatively noise-free channels prior to assigning relatively noisy channels.

The practice of assigning the relatively noise-free channels on a first come first served basis is deficient. It is deficient in that it fails to take into account the fact that certain mobile subscriber units can tolerate a relatively noisy channel much more easily than other mobile subscriber units. For example, mobile subscriber units vary in power (e.g., a mobile telephone typically has a transmit power of 3.0 watts, while a portable typically has a transmit power of 0.6 watts, while a transportable typically has a transmit power of 1.6 watts). Thus, all other things being equal, it would make more sense to assign the higher power transmitters to the more noisy channels, since the signal-to-noise ratios of such an assignment would be better than if lower power transmitters were assigned to the relatively noisy channels.

In addition, assigning mobile units whose signal strengths are higher to more noisy channels makes good sense in that the objective of the cell is to maintain a certain minimum transmission capacity on all channels utilized within the cells. As has been discussed, TDMA is now utilizing transmission of digital data. The signal-to-noise ratio is especially important in the transmission of digital data, in that it determines the upper bound on the achievable data rate. A result from information theory is that the maximum channel capacity, in bits per second, obeys the equation $C = W \log_2 (1+S/N)$ where W is the bandwidth of the channel in hertz and S/N is the signal-to-noise power ratio express in dBs. Thus, in order to maintain similar capacities on all channels it makes sense to strive for similar signal-to-noise ratios on all channels.

Thus, it is apparent that a need exists for a method and system that takes the measured received signal strength of mobile subscriber units into account when allocating relatively noisy to relatively noise free channels to mobile subscriber units when such allocation is done in response to mobile subscriber units' request for channel access, irrespective of whether such request is to service a handoff request or a call access request.

SUMMARY OF THE INVENTION

It is therefore one object of the present invention to provide an improved method and system, to be utilized with wireless communication systems having cellular architectures.

It is yet another object of the present invention to provide an improved method and system, to be utilized with wireless communication systems having cellular architectures, and which ensure near uniform capacity and quality of data channels within each cell.

It is yet still another object of the present invention to provide an improved method and system to be utilized with wireless communication systems having cellular architectures, and which ensure near uniform capacity and quality of data channels within each cell by taking the measured received signal strength of mobile subscriber units into account when allocating relatively noisy and relatively noise free channels to mobile subscriber units either during handoff from other cells into a current cell or in response to a request for call access originating in a current cell.

The foregoing objects are achieved as is now described. A method and system are provided for use with wireless communication systems having a cellular architecture with at least a first and a second cell. The method and system provided ensure near uniform capacity and quality of data channels within the second cell. The method and system achieve the foregoing objects via the following steps. The noise signal power in unused data channels within the second cell is monitored. When a request for channel access is received, it is determined whether the request for channel access is either a request for handoff of a call-in-progress from the first cell into the second cell, or not. In the event that the request is not a request for handoff, it is determined whether the number of idle channels within the second cell has fallen below a prespecified number of channels reserved for handoff into the second cell. If the number of idle channels has not fallen below a prespecified number of channels reserved for handoff into the second cell, then it is known that idle channels exist to satisfy the request for channel access.

In the event that it is determined either that the request for channel access is either a request for handoff of a call-in-progress, or both that the request for channel access is not a request for handoff and that the number of idle channels in the second cell has not fallen below a prespecified number of channels reserved for handoff, a measured received signal power of a mobile unit subscriber unit making the request for access is determined. One of the unused data channels in the second cell is then preferentially assigned to the mobile subscriber unit where such preference in assigning is to assign a noisy channel, provided that a signal to noise ratio calculated upon the monitored measured received signal power and the monitored noise signal power of the preferentially assigned noisy channel meets or exceeds a required signal to noise ratio such that near uniform capacity and quality of data channels within the first cell is ensured.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is directed toward improving the signal to noise ratio (and hence, capacity and quality) of channels within individual cells in a cellular network. An illustrative embodiment regarding channel assignment at handoff will be discussed in this application, but it will also be understood by those within the art that the present invention can also be utilized to improve channel assignment for cells originating within a cell itself.

Figure 1:
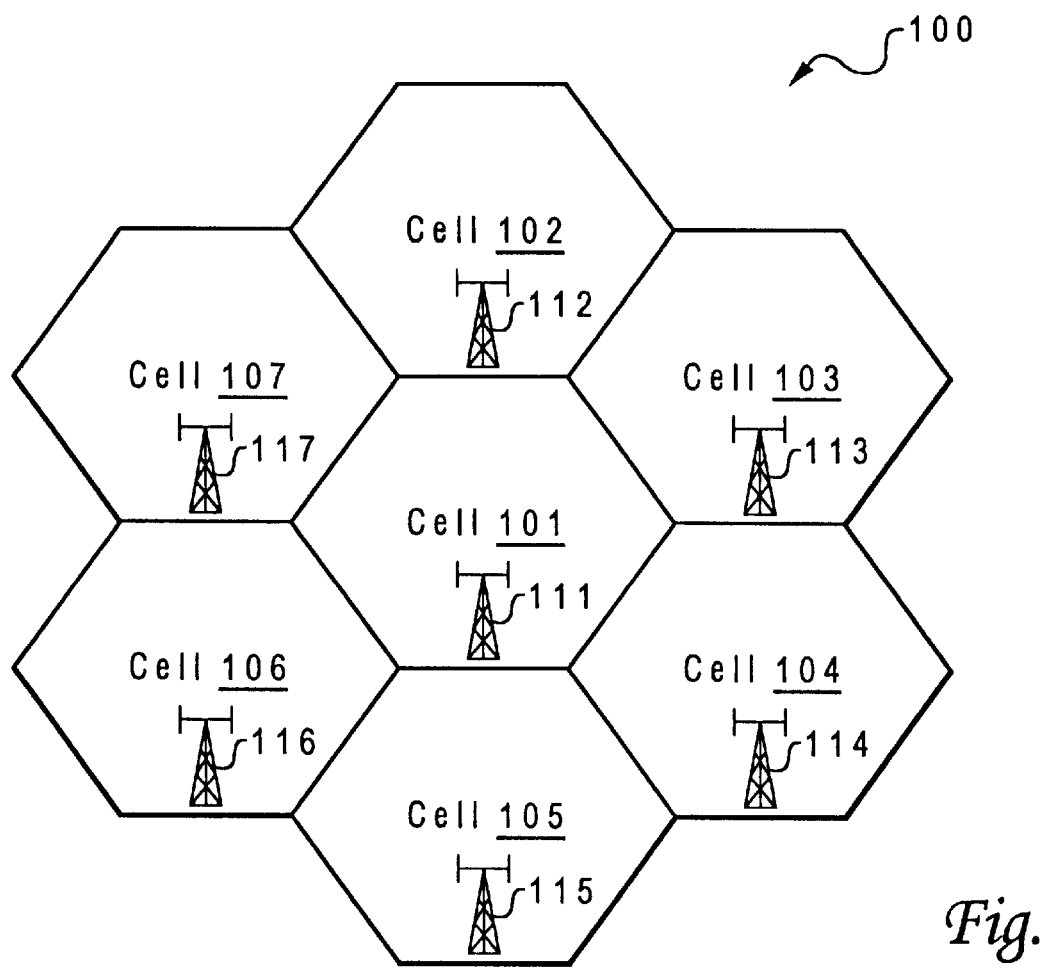
FIG. 1 depicts a cell cluster within a wireless communication system having a cellular architecture within which the method and system of the present invention may be implemented.

With reference to the figures and in particular with reference now to FIG. 1, there is depicted a cell cluster. Recall that in the above discussion it was noted that frequency reuse is a concept that has been utilized to allow cellular communications over a large area. It is common to create a cell cluster, as is shown in FIG. 1, whereby the frequency reuse concept is implemented. A cell cluster is a group of cells. No channels are reused within a cluster. FIG. 1 illustrates seven-cell cluster 100.

A "cell" is the basic geographic unit of a cellular system. The term "cellular" comes from the honeycomb shape of the areas into which a coverage region is divided. In FIG. 1 each cell 101, 102, 103, 104, 105, 106, and 107 is depicted as a honeycomb shape within which base stations 111, 112, 113, 114, 115, 116 and 117, respectively, are shown. Cells are pictographic representations of the effective geographic area of base station (a base station includes but is not limited to transmitters and receivers sufficient to service existing cell channels within a particular cell) transmitters that are for convenience represented as hexagons. Each cell size varies depending on the landscape. Because of constraints imposed by natural terrain and man-made structures, the true shape of cells is not a perfect hexagon.

Since seven-cell cluster 100 utilizes the frequency reuse concept, each cell in FIG. 1 utilizes a set of channels wherein each channel is based upon a set of carrier frequencies different from those utilized by any other cell 101, 102, 103, 104, 105, 106, 107 within seven-cell cluster 100. Thus, if available frequencies are divided evenly, each cell 101, 102, 103, 104, 105, 106, and 107 will utilize ⅐ of frequencies available for use.

Figure 2:
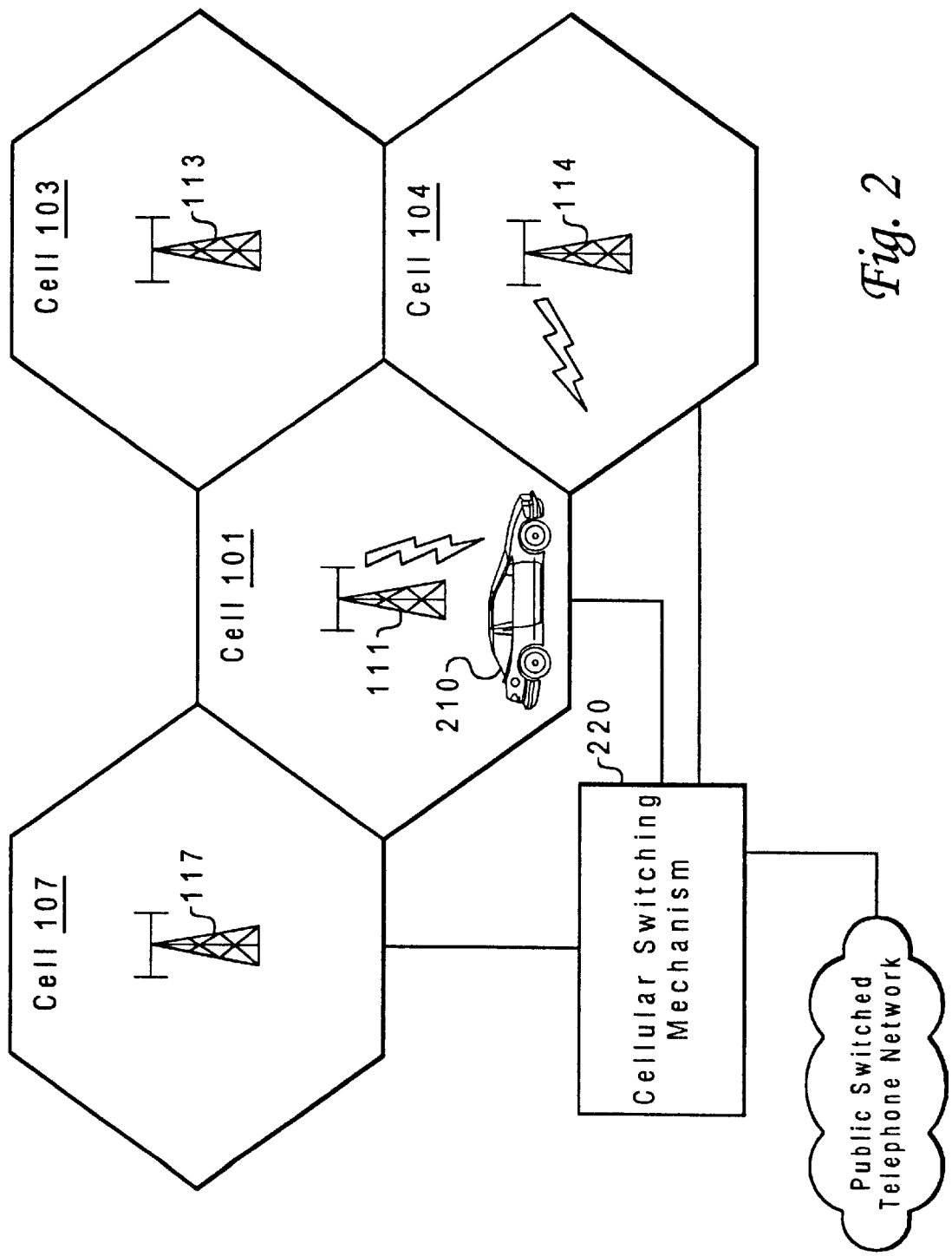
FIG. 2 is a partially schematic diagram depicting a mobile subscriber unit transiting from one cell to another.

Refer now to FIG. 2, which is a partially schematic diagram depicting a mobile subscriber unit 210 transiting from cell 101 to cell 104. Recalling from the discussion above that each "cell" is actually a pictographic representation of the effective area of use covered by a base station, it can be seen from FIG. 2 that when mobile subscriber unit 210 transits from cell 101 to cell 104, the base station 114 of cell 104 must either assume responsibility for any call-in-progress between mobile subscriber unit 210 or any such call-in progress will be terminated. As has been discussed, cell 104 assumes responsibility for any call-in-progress between mobile subscriber unit 210 and base station 111 serving cell 101 by "handing off" the call to base station 114 serving cell 104. This process of "handing off" is merely called "handoff" in the art.

Regardless of technology, the following steps are part of handoff of any call. The first step in handoff is to assume a starting state wherein only one cell is supporting call in question, which in FIG. 2 relates to cell 101 supporting a call from mobile subscriber unit 210. The second step in handoff is to determine that over-the-air link conditions between mobile subscriber unit 210 and serving cell 101 are deteriorating, and that there is a potentially better link to a new, candidate cell adjoining cell 101. The third step is to select a candidate cell for handoff, which in FIG. 2 equates to cell 104 since that is the cell into which mobile subscriber unit 210 is transiting. The fourth step is to inform chosen candidate cell 104 of the imminent handoff, and of the parameters necessary to identify mobile subscriber unit 210 and execute the handoff. The fifth step is for cell 104 to answer back to cell 101 indicating mobile subscriber unit 210 what channel mobile subscriber unit 210 is to be assigned for communication within cell 104. The sixth step is for cell 104 to direct the mobile to begin executing the handoff, which equates to instructing the mobile to tune to an assigned channel for communication within cell 104. The seventh step is for cell 104 to assume responsibility for the call on the channel that cell 104 has assigned to mobile subscriber unit 210. Lastly, following successful handoff cell 101 drops responsibility for the call.

As has been discussed, TDMA typically consists of an overlay of digital signal processing onto an AMPS or a NAMPS system, and NAMPS generally consists of the Frequency Division Multiplexing of an AMPS system. Thus, TDMA continues to use hand off, and insofar as handoff decisions are concerned, the handoff is generally made on the basis of the strength of the received AMPS signals. Consequently, the following discussion will describe handoff of an AMPS system, with it being understood that such discussion also applies to NAMPS, TDMA systems, or any digital system transmission (such as GSM, or PCS) over a wireless link which utilizes handoff.

The handoff trigger in an AMPS system can be any one of several things. Absolute received signal level as measured by the current serving cell receiver, signal power difference between the current serving cell and a candidate cell, or receiver quieting as measured, for example, by the post-detection signal-to-noise ratio. However, the solution that has generally been adopted by the infrastructure manufacturers is to monitor a received signal strength indicator (RSSI) on the current serving cell. When the RSSI drops below a threshold, then measurements are requested by cellular switching mechanism 220 from predetermined handoff candidate cells (e.g. all or a part of the cells surrounding a current cell). After the measurement reports are collected by cellular switching mechanism 220, the candidate is chosen and handoff is initiated.

Figure 3:
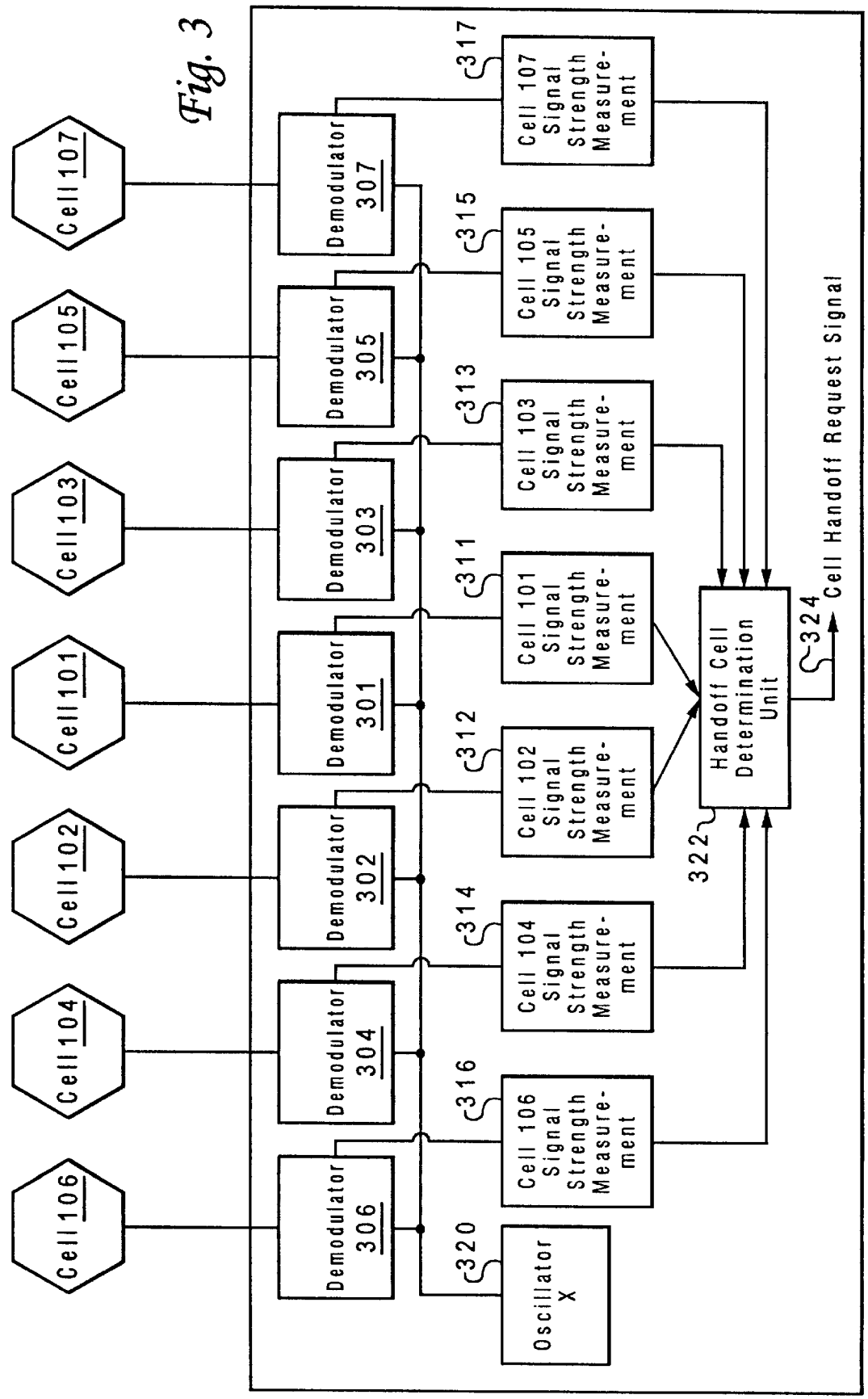
FIG. 3 is a partially schematic representation demonstrating concepts involved in handoff based on a Received Signal Strength Indicator.

Refer to FIG. 3, which is a partially schematic representation demonstrating some of the concepts involved in handoff based on RSSI. Assume, that as shown in FIG. 2, mobile subscriber unit 210 is being serviced by cell 101, but that mobile subscriber unit 210 is currently transiting into cell 104. Assume also that while in cell 101 mobile subscriber unit 210 is utilizing a channel "X" of cell 101. Recall from above that the first step in handoff is determining that a RSSI has fallen below some threshold. FIG. 3 illustrates a mechanism whereby this quantity could be measured in that a signal from cell 101 is fed into demodulator 301 which is being driven by an oscillator 320 at the receive frequency of channel "X" of cell 101. The demodulated receive signal of channel "X" is then fed into cell 101 received signal strength measurement device 311, which produces a Received Signal Strength Indicator (RSSI) which is fed to (among other things) handoff cell determination unit 322. Once handoff cell determination unit 322 has determined that the RSSI of Channel "X" in Cell 1 has fallen below a certain predetermined threshold, handoff cell determination unit 322 queries (queries not shown) other cells (which for sake of illustration are shown in FIG. 3 as the rest of the cells in seven-cell cluster 100) as to the strength of mobile subscriber unit 210 transmissions on Channel "X" of cell 101 in those queried cells.

FIG. 3 shows that in response to the queries, (again, queries are not shown) the signals received in each of the queried cells 102–107 are demodulated by demodulators 302–307 using the frequency generated by oscillator 320 (oscillator 320 generates the frequency upon which mobile subscriber unit 210 transmits while using channel "X" in cell 101). FIG. 3 depicts that such demodulated signals are then fed into received signal strength measurement devices 312, 313, 314, 315, 316, and 317 which measure the strength of the received signal in cells 102, 103, 104, 105, 106, and 107, respectively. The respective RSSIs for each cell produced by each of the signal strength measurement devices 302–307 are then fed to handoff cell determination unit 322. Handoff cell determination unit 322 then utilizes the RSSIs of the strength of the signal in cells 102–107 in order to determine which cell the call-in-progress from mobile subscriber unit 210 is to be handed into.

Continuing with the situation shown in FIG. 2, the situation of FIG. 2 indicates that as mobile subscriber unit 210 transits into cell 104, the RSSI for the transmit signal of mobile subscriber unit 210 will be highest in cell 104. Thus, when the transmit signal from mobile subscriber unit 210 falls below a predetermined threshold RSSI in cell 101, handoff cell determination unit 322 determines that cell 104 is the appropriate candidate cell for handoff and thus initiates cell handoff request signal 324.

Figure 4:
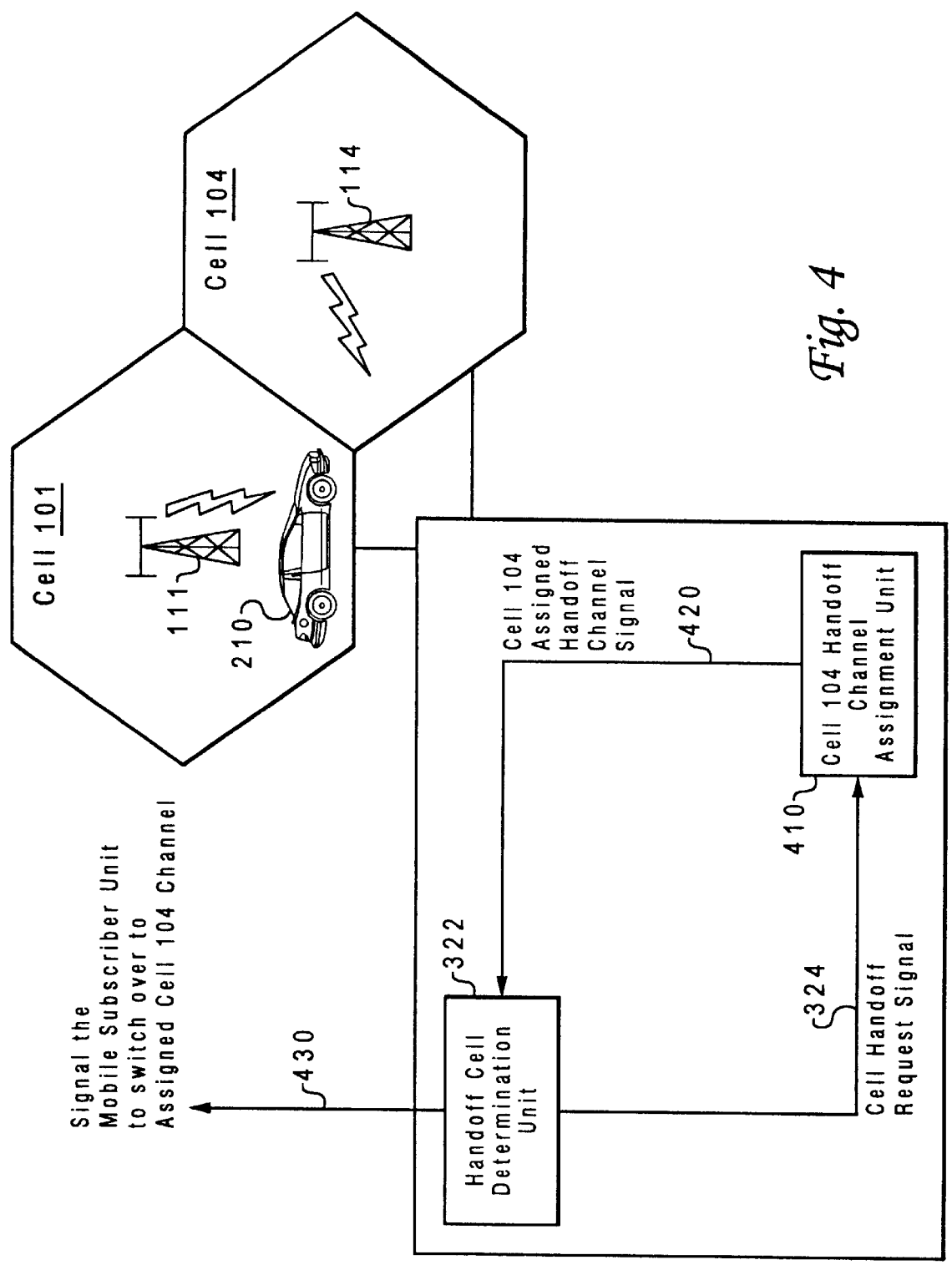
FIG. 4 illustrates events subsequent to the last event discussed in relation to FIG. 3.

FIG. 4 illustrates events subsequent to handoff cell determination unit 322 initiating cell handoff request signal 324 as was discussed in relation to FIG. 3, as those subsequent events will transpire using an illustrative embodiment of the present invention. In the prior art, cell handoff request signal 324 merely informs cell 104 handoff channel assignment unit 410 that cell 104 is to assume responsibility for mobile subscriber unit 210 (it will be assumed for ease of illustration of an illustrative embodiment of the present invention that the cell 104 can accept handoff), which is currently utilizing channel "X" within cell 104. However, in an illustrative embodiment of the present invention, cell handoff request signal 324 will include an additional component: the RSSI of mobile subscriber unit 210's transmit signal in cell 104 that was utilized by handoff cell determination unit 322 to make the determination to hand mobile subscriber unit 210's call over to cell 104. Cell 104 handoff channel assignment unit 410 will then utilize the RSSI of mobile subscriber unit 210's transmit signal to determine which of cell 104's available, unused channels will be assigned to mobile subscriber unit 210 for communication within cell 104 (the specifics of how the RSSI is utilized is discussed below in relation to FIGS. 5 and 6). Once cell 104 handoff channel assignment unit 410 has utilized the RSSI to determine some appropriate channel in cell 104 to which mobile subscriber unit 210 is to be assigned it sends a signal (cell 104 assigned handoff channel signal 420) back to handoff cell determination unit 322, which subsequently initiates communication with mobile subscriber unit 210 and directs mobile subscriber unit 210 to begin communicating with base station 114 in cell 104 on the frequencies (forward and return links) encompassed by the assigned channel of cell 104 via switch over to assigned cell 104 channel signal 430.

Figure 5:
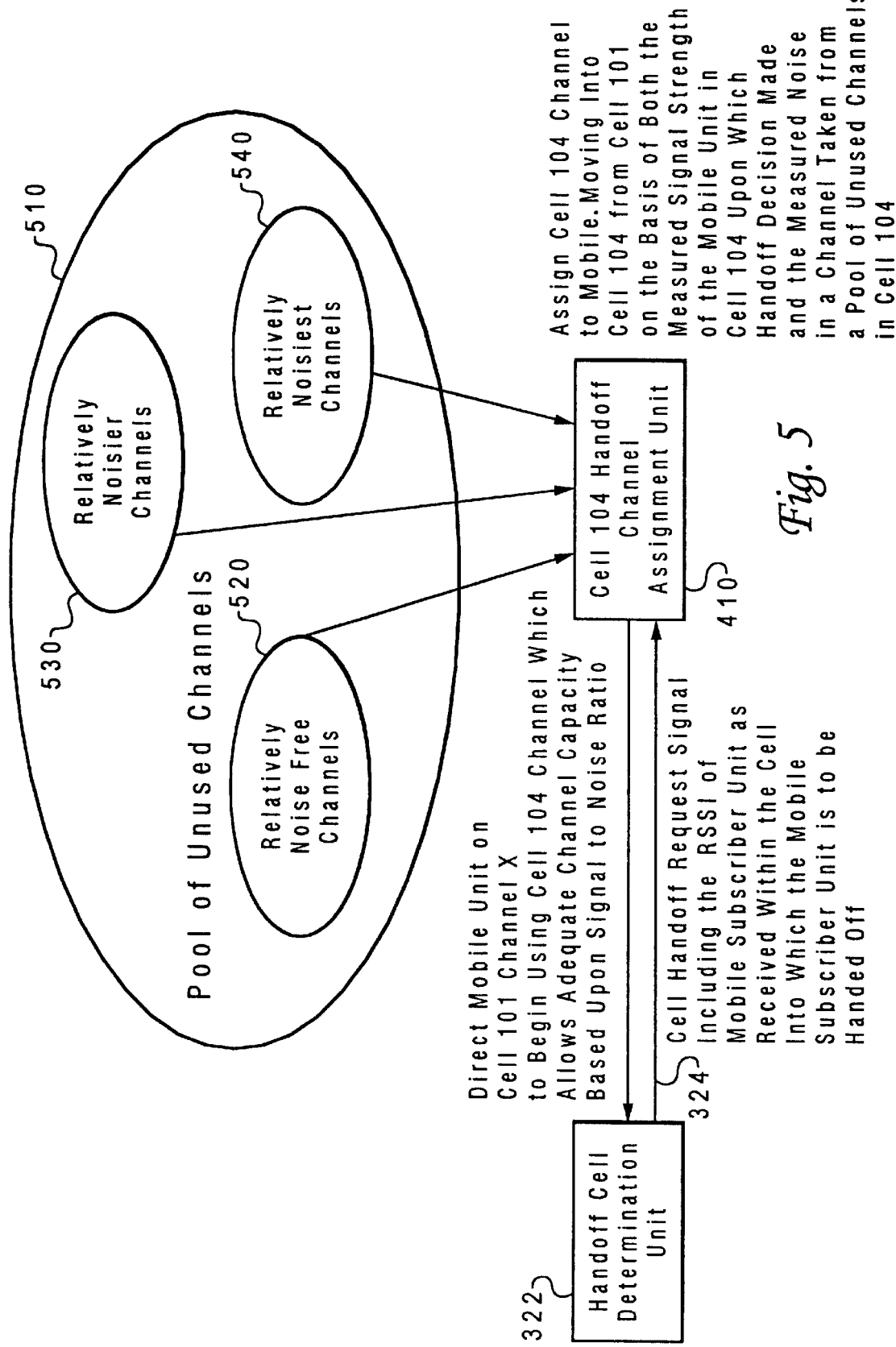
FIG. 5 depicts a partially schematic diagram of how in an illustrative embodiment of preferred invention a handoff channel assignment unit assigns an unused channel from a pool of unused channels to a mobile subscriber unit being handed into a cell.

FIG. 5 depicts a partially schematic diagram of the concepts involved when cell 104 handoff channel assignment unit 410 assigns an unused channel to mobile subscriber unit 210 in response to cell handoff request signal 324, which includes the RSSI of mobile subscriber unit 210's transmitter power as such transmitter power is received by base station 114 in cell 104. Shown in FIG. 5 is that cell 104 handoff channel assignment unit 410 selects the channel to be assigned from pool of unused channels 510. Shown, for illustrative purposes, is that pool of unused channels 510 has been further subdivided into pool of relatively noise free channels 520, pool of relatively noisier channels 530, and pool of relatively noisiest channels 540. Notice that the division of pool of unused channels 510 into three subpools is merely shown for illustration. The division of the pools is made on the basis of the power of the noise detected within the unused channels. It will be understood by those within the art that such subdividing could be finer, including even the possibility of ranking each channel in pool of unused channels 510 on the strength of noise detected within each individual unused channel.

In an illustrative embodiment, cell 104 handoff channel assignment unit 410 will utilize the RSSI of mobile subscriber unit 210's transmit signal as received within cell 104 to determine from which pool the channel to be assigned to the mobile subscriber unit 210 is to be drawn. There are many ways such assignment could be done, but one way would be to mandate that the signal-to-noise ratio in any particular assigned channel falls above certain prescribed limits (e.g., 40 dB), and that any mobile subscriber unit in the cell is to be assigned to the noisiest channel which will still satisfy the mandated signal-to-noise ratio. The foregoing would ensure that the clearest channels would then be utilized by the weakest signals, thereby increasing the likelihood that communications capacities could be supported across a broader segment of users than that available without assigning the channels on such a basis.

Figure 6:
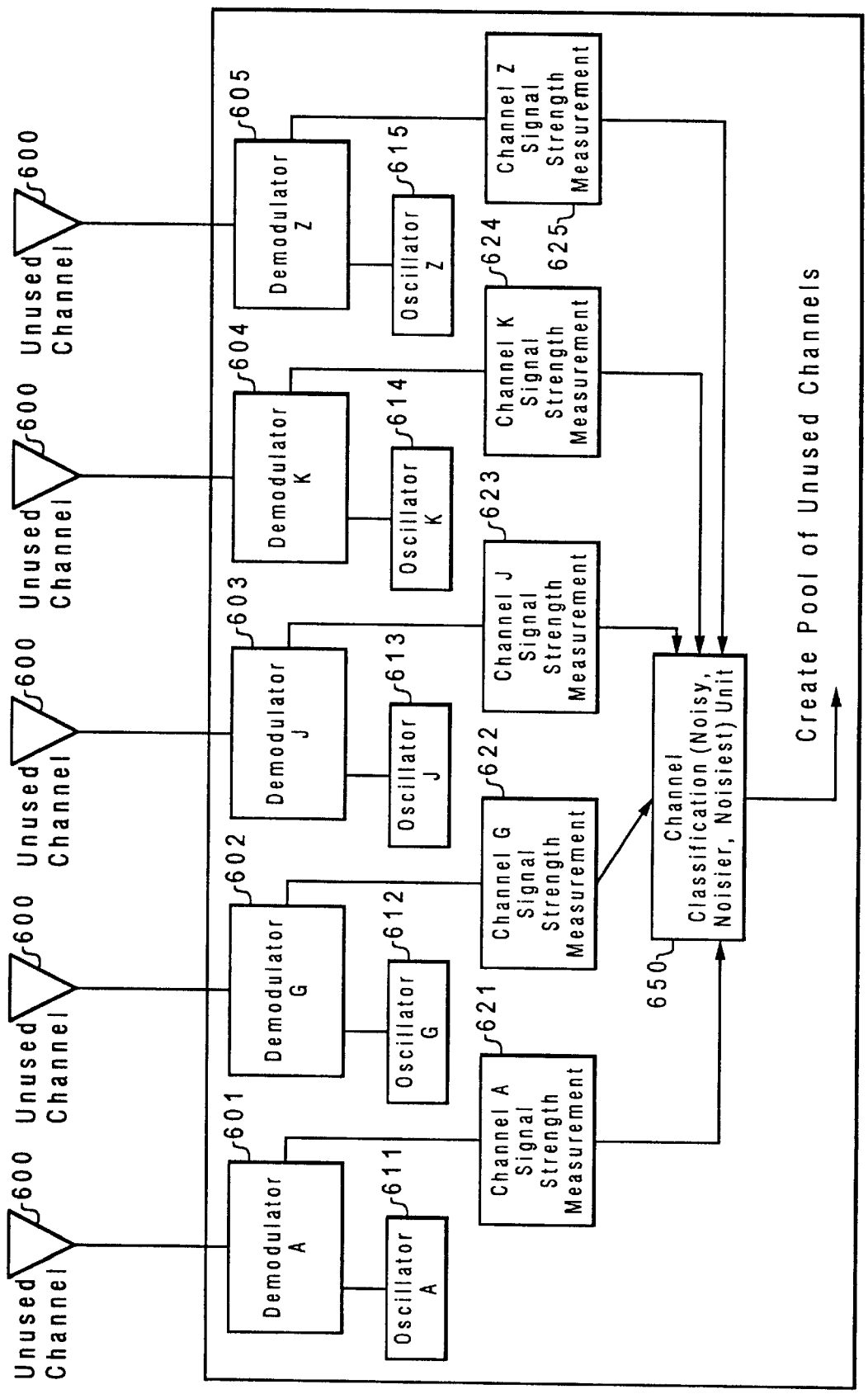
FIG. 6 depicts a partially schematic representation demonstrating the concepts involved in creating pool of unused channels 510 of FIG. 5.

FIG. 6 depicts a partially schematic representation demonstrating the concepts involved in creating pool of unused channels 510 of FIG. 5. Shown in FIG. 6 for sake of example, is base station 114 receiving antenna 600 (which is redrawn 5 times in the figure solely for the sake of illustration). Shown is that the signal from base station 114 is fed into a number of demodulators A 601, G 602, J 603, K 604, Z 605 which are driven by oscillators A 611, G 612, J 613, K 614, and Z 615, respectively. For the sake of illustration the demodulators shown are those corresponding to unused channels A, G, J, K, and Z within cell 104. It is to be understood that the other channels within the cell are "in use."

Even though unused channels A, G, J, K, and Z within cell 104 are not receiving a transmitted signal, such channels are receiving an ambient noise signal in the frequency band of the reverse link in each channel. From this noise signal the noise power in unused channels A, G, J, K, and Z can be determined by measuring the power of the noise signals emanating from demodulators A 601, G 602, J 603, K 604, and Z 605, respectively. The power of the noise signals can be determined by the output of the signal strength measurement devices A 621, G 622, J 623, K 624 and Z 625 for channels A, G, J, K, and Z, respectively. The power of the noise on each channel can then be utilized by channel classification unit 650 to create pool of unused channels 510 and subpools based upon predefined upper and low noise power threshold limits for each subpool that is to be created. Those skilled in the art will understand that more then just 3 such classification could be created if other thresholds were chosen.

Figure 7:
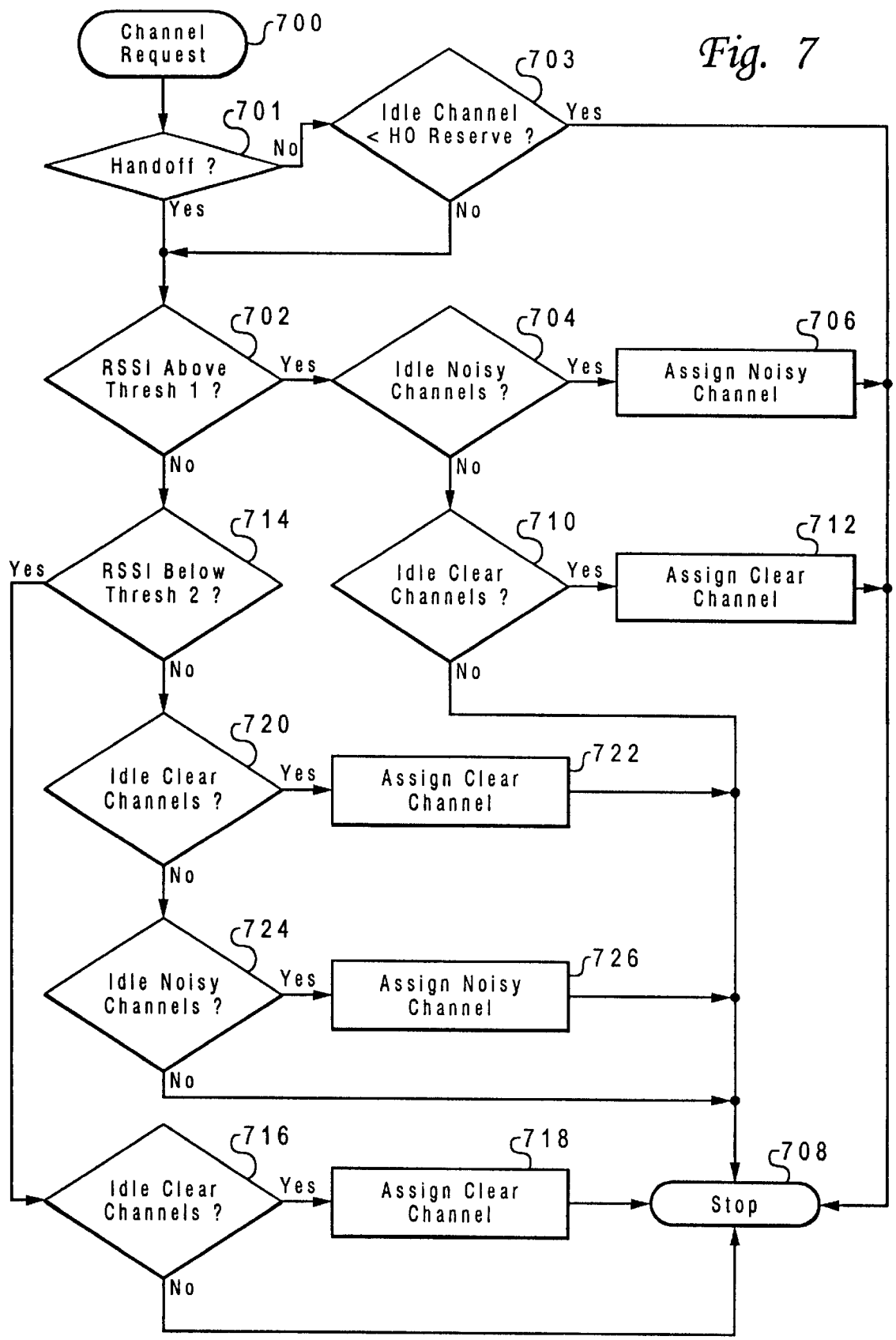
FIG. 7 is a high-level logic flowchart depicting the method and process of an illustrative embodiment of the present invention.

Refer now to FIG. 7, which is a high-level logic flowchart depicting the method and process of an illustrative embodiment of the present invention. Method step 700 depicts the initial event in the process, which is the receipt of a request for channel access by a channel assignment unit within a particular cell. Method step 701 depicts the determination of whether the channel request received in method step 700 was a handoff request. If it is determined that the request for channel access received in method step 700 was a handoff request, then the process proceeds to method step 704. However, if it is determined that the request for channel access received in method step 700 was not a handoff request, then it is known that what was received was merely a request for channel access for a call to originate within the cell. Accordingly, the process proceeds to method step 703, wherein it is determined if the unused (idle) channels within the cell are less than a preset number of channels within the cell which have been reserved for handoff. If the number of idle channels has fallen below the preset number of channels reserved for handoff, the request for channel access will not be granted, and thus the process proceeds to method step 708 and stops. If it is determined that the number of idle channels within the cell is at or above the preset number reserved for idle channels, then it is known that channels are available to answer the received request for channel access, and thus the process proceeds to method step 702.

As was discussed in relation to FIGS. 4 and 5, in an illustrative embodiment of the present invention the handoff signal includes a measure of the RSSI of the transmit power of the mobile subscriber unit to be handed off as that transmit power appears in the cell into which the mobile subscriber unit is to be handed. Method step 702 illustrates the determination of whether the RSSI of the transmit power of the mobile subscriber unit is higher than a preset threshold. If the RSSI of the transmit power of the mobile subscriber unit is above the preset threshold, then the process proceeds to method step 704 wherein it is determined if idle noisy channels exist. If the inquiry of method step 704 determines that idle noisy channels exist, then the process proceeds to method step 706 wherein it is shown that a determination is made to assign one of the idle noisy channels to the mobile subscriber unit 210. Subsequently, the process proceeds to method step 708 and stops.

If the determination of method step 704 determined that no idle noisy channels are extant, the process proceeds to method step 710 wherein it is determined if idle clear channels exist. If the inquiry of method step 710 determines that idle clear channels exist, then the process proceeds to 712 wherein it is shown that a determination is made to assign one of the idle clear channels the mobile subscriber unit. Subsequently, the process proceeds to method step 708 an stops.

If the determination of method step 702 determined that the RSSI of the transmit power of the mobile subscriber unit was below a first preset threshold, then the process proceeds to method step 714 wherein it is determined if the RSSI of the transmit power of the mobile subscriber unit is below a second preset threshold. If the RSSI of the transmit power of the mobile subscriber unit 210 is below a second preset threshold the process proceeds to method step 716 wherein it is determined if idle clear channels exist. If the inquiry of method step 716 determines that idle clear channels exist, then the process proceeds to 718 wherein it is shown that a determination is made to assign one of the idle clear channels the mobile subscriber unit. Subsequently, the process proceeds to method step 708 and stops. If the inquiry of method step 716 determines that idle clear channels do not exist, then the process proceeds to method step 708 and stops.

If the inquiry of method step 714 determined the RSSI of the transmit power of the mobile subscriber unit 210 was not below a second preset threshold then the process proceeds to method step 720 wherein it is determined if idle clear channels exist. If the inquiry of method step 720 determines that idle clear channels exist, then the process proceeds to 722 wherein it is shown that a determination is made to assign one of the idle clear channels the mobile subscriber unit 210. Subsequently, the process proceeds to method step 708 and stops.

If the inquiry of method step 720 determines that idle clear channels do not exist, then the process proceeds to method step 724 wherein it is determined whether idle noisy channels exist. If the inquiry of method step 724 determines the idle noisy channels exist, then the process proceeds to method step 726 wherein it is shown that a determination is made to assigned one of the idle noisy channels to the mobile subscriber unit. Subsequently, the process proceeds to method step 708 and stops.

If the inquiry of method step 724 determines that idle noisy channels do not exist, the process proceeds to method step 708 and stops.

The foregoing discussion of only dealt with two preset thresholds. Those skilled in the art will recognize that virtually any number of such preset thresholds can be utilized and the two threshold method of FIG. 7 modified to accommodate the additional thresholds. Such modification would essentially entail leaving methods steps 702, 704, 706, 710, and 712 as is for the highest preset threshold, adding method steps analogous to method steps 702, 704, 706 and 712 for each intermediate threshold level, and utilizing method steps 714, 716, 718, 720, 722, 724 and 726 for the lowest threshold level in exactly the same manner as is shown in FIG. 5 for the second preset threshold level.

Those skilled in the art will recognize that there are many ways the preset threshold levels referenced in relation to FIG. 7 could be determined. One way such thresholds could be determined would be to first choose some optimal signal to noise ratio, second define a noisy channel to be some specified magnitude of noise power, and third determine the signal power that would be necessary to exceed the chosen optimal signal to noise ratio when utilized with the defined noisy channels with that determined signal power ultimately being deemed the first preset threshold discussed in FIG. 5. Subsequently, a second sub-optimal (but acceptable) signal to noise ratio could be defined and the second preset threshold could be chosen such that if the signal power was in excess of the threshold the sub-optimal (but acceptable) performance could be obtained, even with such signal was transmitted through the noisy channel.

Furthermore, those skilled in the art will appreciate that the path composed of method steps 714, 716, and 718 in FIG. 7 assumes that the assignment of a relatively "noisy" channel would cause a call to drop, which is why calls below a second preset threshold are assigned "clear" channels if such are available. Consequently, those skilled in the art will also recognize that if such assumption is not true, then the embodiment shown in FIG. 7 could operate without the path composed of method steps 714, 716, and 718; that is, if the assumption that the assignment of a "noisy" channel would cause a call to drop is not valid, then the path composed of method steps 714, 716, and 718 is optional.

Figure 8:
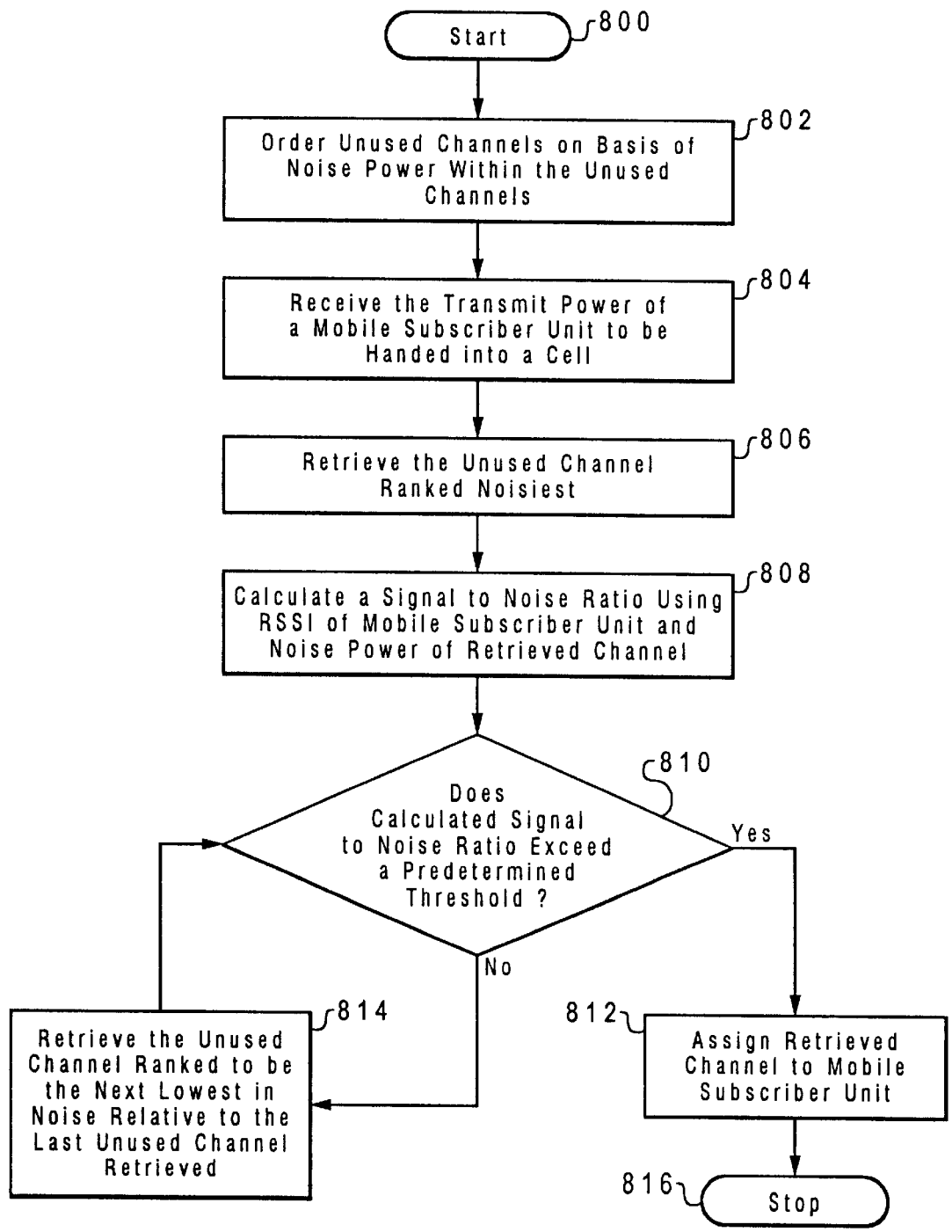
FIG. 8 is a second illustrative embodiment of the method and process of an illustrative embodiment of the present invention.

Refer now to FIG. 8, which is a second illustrative embodiment of the method and process of an illustrative embodiment of the present invention. Method step 800 shows the start of the process. Method step 802 shows the rank ordering of unused channels within a cell on the basis of noise power in the channels. Method step 804 shows the reception of a cell handoff signal, which, as was discussed above, included with it the transmit power of the mobile subscriber unit to be handed into the cell. Method step 806 shows the retrieval of the noise power of the noisiest unused channel in the rank ordered listing created in method step 802. Method step 808 shows the calculation of a signal to noise ratio using the RSSI of the mobile system subscriber unit and the retrieved noise power. Method step 810 shows the determination of whether the signal to noise ratio exceeds a determined threshold. If the signal to noise ratio does exceed a predetermined threshold, then the process proceeds to method step 812 and a determination is made to assign the channel corresponding to the retrieved noise power utilized to calculate the signal to noise ratio to the mobile subscriber unit.

If the determination of method step 810 did not exceed a predetermined threshold, then the process proceeds to method step 814 wherein the noise power of the next least noisiest channel is retrieved. The process then proceeds to method step 816 and continues from that point.

While both the embodiments have set forth a scheme in which the measured received signal strength is determined at the cell site (i.e., from the cell site perspective), those skilled in the art will understand that there are at least two ways of determining measured received signal strength and whether idle channels are relatively noisy. That is, those skilled in the art will recognize that measured received signal strength and noise in idle channels could also be measured at the mobile subscriber units themselves with the same effect. Those skilled in the art will recognize that IS-136 provides a "MACA" capability which allows the collection of the mobile perspective view of a situation. Thus, those skilled in the art will recognize that with slight modifications the above two embodiments could be modified to utilize measurements taken from the standpoints of the mobile subscriber units themselves to accomplish the objectives of the present invention.

Figure 9:
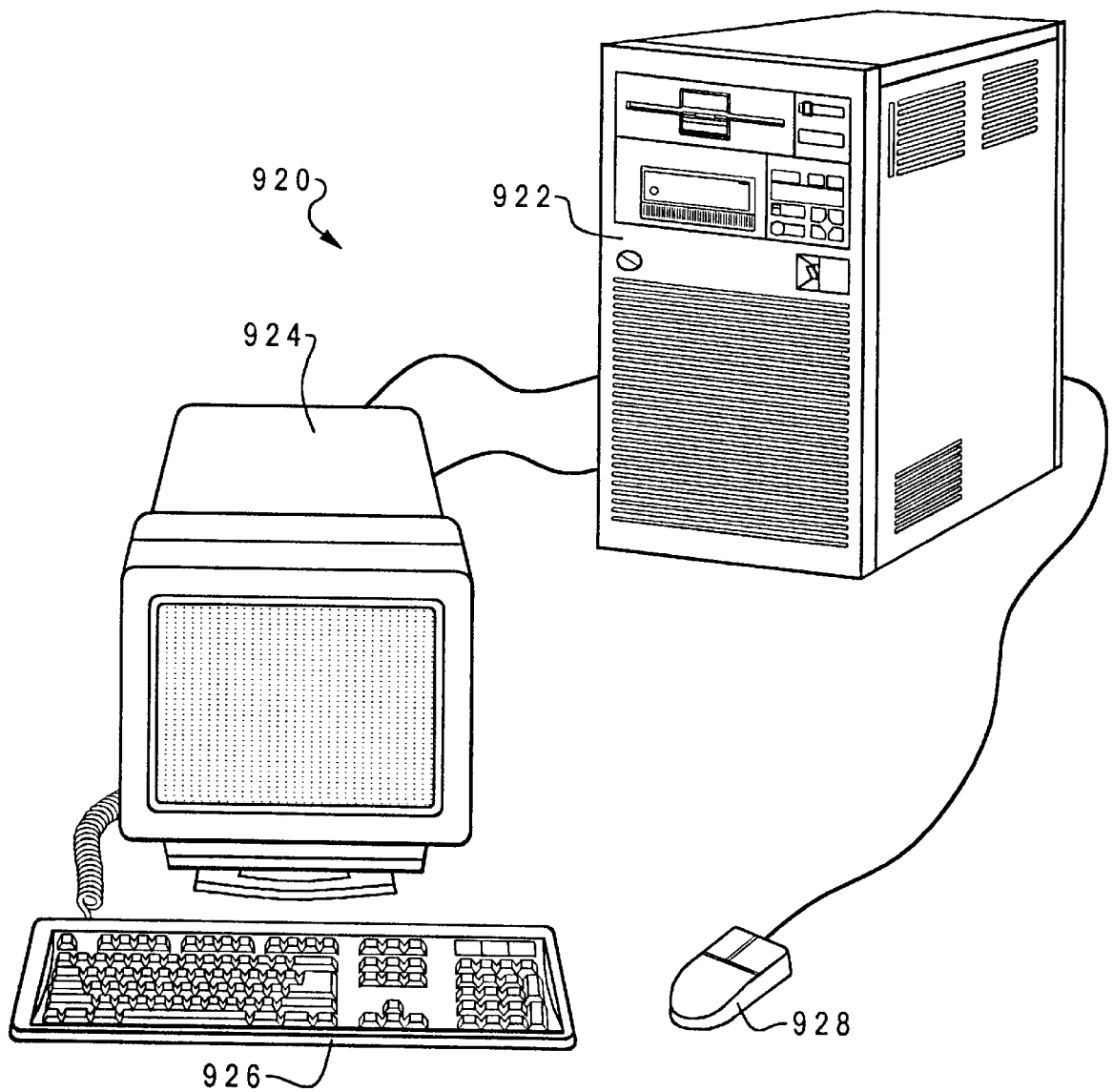
FIG. 9 depicts a pictorial representation of a data-processing system which can be utilized in accordance with the method and system of an illustrative embodiment of the present invention.

With reference now to the figures and in particular with reference now to FIG. 9, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 9. A computer 920 is depicted which includes a system unit 922, a video display terminal 924, a keyboard 926, and a mouse 928. Computer 920 may be implemented utilizing any suitably powerful computer, such as commercially available mainframe computers, minicomputers, or microcomputers.

Figure 10:
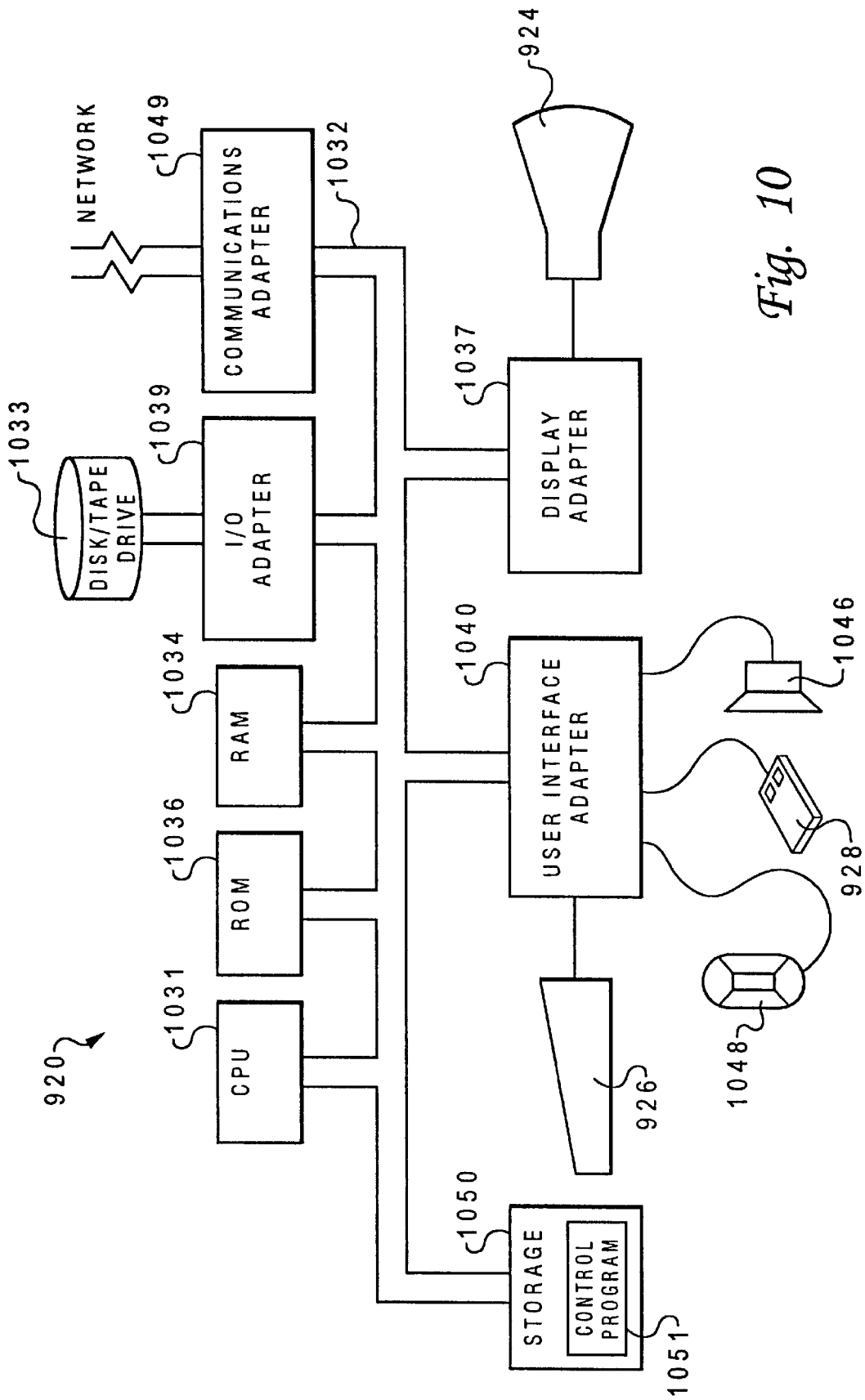
FIG. 10 illustrates a representative hardware environment which can be utilized in accordance with the method and system of an illustrative embodiment of the present invention.

FIG. 10 is an illustration of a representative hardware environment which can be utilized in accordance with the method and system of an illustrative embodiment of the present invention. FIG. 10 depicts selected components in computer 920 in which an illustrative embodiment of the present invention may be implemented. System unit 922 includes a Central Processing Unit ("CPU") 1031, such as a conventional microprocessor, and a number of other units interconnected via system bus 1032. Computer 920 includes random-access memory ("RAM") 1034, read-only memory ("ROM") 1036, display adapter 1037 for connecting system bus 1032 to video display terminal 924, and I/O adapter 1039 for connecting peripheral devices (e.g., disk and tape drives 1033) to system bus 1032. Video display terminal 924 is the visual output of computer 920, which can be a CRT-based video display well-known in the art of computer hardware. However, with a portable or notebook-based computer, video display terminal 924 can be replaced with an LCD-based or a gas plasma-based flat-panel display. Computer 920 further includes user interface adapter 1040 for connecting keyboard 926, mouse 928, speaker 1046, microphone 1048, and/or other user interface devices, such as a touch screen device (not shown), to system bus 1032. Communications adapter 1049 connects computer 920 to a data-processing network.

Any suitable machine-readable media may retain the method and system of an illustrative embodiment of the present invention, such as RAM 1034, ROM 1036, a magnetic diskette, magnetic tape, or optical disk (the last three being located in disk and tape drives 1033). Any suitable operating system and associated graphical user interface (e.g., Microsoft Windows) may direct CPU 1031. For example, the AIX operating system and AIX windows windowing system (i.e., graphical user interface) can direct CPU 1031. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 1031, such as touch-screen technology or human voice control. In addition, computer 920 includes a control program 1051 which resides within computer storage 1050. Control program 1051 contains instructions that when executed on CPU 1031 carries out the operations depicted in the logic flowcharts of FIGS. 7, and 8 and the partially schematic diagrams of FIGS. 3, 4, 5 and 6 as described herein.

Those skilled in the art will appreciate that the hardware depicted in FIGS. 9 and 10 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for use with wireless communications systems having a cellular architecture with at least a first and a second cell, said method ensuring near uniform capacity and quality of data channels within said second cell, and said method comprising the steps of:

monitoring a noise signal power in unused data channels within said second cell, wherein said unused data channels are grouped into at least a noisy group of unused data channels and a clear group of unused data channels on the basis of said monitored noise signal power;

monitoring a received signal power of a first mobile subscriber unit engaged in a call-in progress when said call-in-progress is to be handed off from said first cell into said second cell;

comparing said monitored received signal power of said first mobile subscriber unit engaged in a call-in-progress with a first prespecified threshold; and in response to a handoff request from said first cell, preferentially assigning one of said unused data channels in said second cell to said first mobile subscriber unit where such preference in assigning is to assign a channel such that a signal to noise ratio calculated upon said monitored received signal power and said monitored noise signal power of said preferentially assigned channel meets or exceeds a required signal to noise ratio such that near uniform capacity and quality of data channels within said second cell is ensured, wherein:

said first mobile subscriber unit engaged in a call-in-progress is assigned an unused data channel from said noisy group of unused data channels when said noisy group contains at least one unused data channel and when said first comparing of said monitored received signal power of said first mobile subscriber unit engaged in a call-in-progress indicates said monitored received signal power is greater than said first prespecified threshold; and said first mobile subscriber unit engaged in a call-in-progress is assigned an unused data channel from said clear group of unused data channels when said clear group contains at least one unused data channel and when said first comparing of said monitored received signal power of said first mobile subscriber unit engaged in a call-in-progress indicates said monitored received signal power is less than said first prespecified threshold.

2. The method of claim 1, wherein said step of monitoring a noise signal power in unused data channels within said second cell further comprises the step of ordering said unused data channels based on said noise signal power to facilitate said grouping.

3. The method of claim 2, wherein said step of ordering further comprises the step of rank ordering said unused data channels from the most noisy to the least noisy on the basis of said monitored noise signal power.

4. The method of claim 3 wherein said step of preferentially assigning further comprises:

calculating one or more signal to noise ratios based upon said monitored received signal power of said first mobile subscriber unit and said rank ordered unused channels; and assigning said first mobile subscriber unit engaged in a call-in-progress the noisiest channel, within said rank ordered unused channels, whose said calculated signal to noise ratio meets or exceeds a predetermined signal to noise ratio.

5. The method of claim 3 wherein said step of preferentially assigning further comprises:

calculating one or more signal to noise ratios based upon said monitored received signal power of said first mobile subscriber unit and said rank ordered unused channels; and assigning said first mobile subscriber unit engaged in a call-in-progress a channel, within said rank ordered unused channels, whose said calculated signal to noise ratio meets or exceeds a predetermined signal to noise ratio.

6. The method of claim 3, further comprising the steps of:

in response to a request by a second mobile subscriber unit for access to a channel where said request for access is not a handoff request, determining whether a number of unused data channels within said second cell has fallen below a prespecified number of channels that have been reserved for handoff;

in response to a determination that said number of unused data channels within said second cell has not fallen below said prespecified number of channels reserved for handoff:

monitoring a received signal power of said second mobile subscriber unit making said request for access to said channel within said second cell; and preferentially assigning one of said unused data channels in said second cell to said second mobile subscriber unit where such preference in assigning is to assign a channel such that a signal to noise ratio calculated upon said monitored received signal power and said monitored noise signal power of said preferentially assigned channel meets or exceeds a required signal to noise ratio such that near uniform capacity and quality of data channels within said second cell is ensured.

7. The method of claim 6 wherein said step of preferentially assigning further comprises:

calculating one or more signal to noise ratios based upon said monitored received signal power of said second mobile subscriber unit and said rank ordered unused channels; and assigning said second mobile subscriber unit engaged in a call-in-progress the noisiest channel, within said rank ordered unused channels, whose said calculated signal to noise ratio meets or exceeds a predetermined signal to noise ratio.

8. The method of claim 6 wherein said step of preferentially assigning further comprises:

calculating one or more signal to noise ratios based upon said monitored received signal power of said second mobile subscriber unit and said rank ordered unused channels; and assigning said second mobile subscriber unit engaged in a call-in-progress a channel, within said rank ordered unused channels, whose said calculated signal to noise ratio meets or exceeds a predetermined signal to noise ratio.

9. The method claim 1, further comprising the steps of:

a second comparing of said monitored received signal power of said first mobile subscriber unit engaged in a call-in-progress with a second prespecified threshold when said first comparing of said monitored received signal power of said first mobile subscriber unit engaged in a call-in-progress indicates said monitored received signal power is less than or equal to said first prespecified threshold;

assigning said first mobile subscriber unit engaged in a call-in-progress an unused data channel from said clear group of unused data channels when said clear group contains at least one unused data channel and when said second comparing of said monitored received signal power of said first mobile subscriber unit engaged in a call-in-progress with a second prespecified threshold indicates that said monitored received signal power of said first mobile subscriber unit engaged in a call-in-progress is greater than or equal to said second prespecified threshold; and assigning said first mobile subscriber unit engaged in a call-in-progress an unused data channel from said noisy group of unused data channels when said clear group is empty and when said second comparing of said monitored received signal power of said first mobile subscriber unit engaged in a call-in-progress with a second prespecified threshold indicates that said monitored received signal power of said first mobile subscriber unit engaged in a call-in-progress is greater than or equal to said second prespecified threshold.

10. The method of claim 1, further comprising the steps of:

in response to a request by a second mobile subscriber unit for access to a channel where said request for access is not a handoff request, determining whether a number of unused data channels within said second cell has fallen below a prespecified number of channels that have been reserved for handoff;

in response to a determination that said number of unused data channels within said second cell has not fallen below and prespecified number of channels reserved for handoff:

monitoring a received signal power of said second mobile subscriber unit making said request for access to said channel within said second cell; and preferentially assigning one of said unused data channels in said second cell to said second mobile subscriber unit where such preference in assigning is to assign a channel such that a signal to noise ratio calculated upon said monitored received signal power and said monitored noise signal power of said preferentially assigned channel meets or exceeds a required signal to noise ratio such that near uniform capacity and quality of data channels within said second cell is ensured.

11. The method of claim 10 wherein said step of preferentially assigning further comprises the steps of:

a first comparing of said monitored received signal power of said second mobile subscriber unit making said request for access with a first prespecified threshold;

assigning said second mobile subscriber unit making said request for access an unused data channel from said noisy group of unused data channels when said noisy group contains at least one unused data channel and when said first comparing of said monitored received signal power of said second mobile subscriber unit making said request for access indicates said monitored received signal power is greater than said first prespecified threshold; and assigning said second mobile subscriber unit making said request for access an unused data channel from said clear group of unused data channels when said noisy group is empty and when said first comparing of said monitored received signal power of said second mobile subscriber unit making said request for access indicates said monitored received signal power is greater than said first prespecified threshold.

12. The method of claim 11, further comprising the steps of:

a second comparing of said monitored received signal power of said second mobile subscriber unit making said request for access with a second prespecified threshold when said first comparing of said monitored received signal power of said second mobile subscriber unit making said request for access indicates said monitored received signal power is greater than said first prespecified threshold;

assigning said second mobile subscriber unit making said request for access an unused data channel from said clear group of unused data channels when said clear group contains at least one unused data channel and when said second comparing of said monitored received signal power of said second mobile subscriber unit making said request for access with a second prespecified threshold indicates that said monitored received signal power of said second mobile subscriber unit making said request for access is greater than or equal to said second prespecified threshold; and assigning said second mobile subscriber unit making said request for access an unused data channel from said noisy group of unused data channels when said clear group is empty and when said second comparing of said monitored received signal power of said second mobile subscriber unit making said request for access with a second prespecified threshold indicates that said monitored received signal power of said second mobile subscriber unit making said request for access is greater than or equal to said second prespecified threshold.

13. An apparatus for use with wireless communications systems having a cellular architecture with at least a first and a second cell, said apparatus ensuring near uniform capacity and quality of data channels within said second cell, and said apparatus comprising:

means for monitoring a noise signal power in unused data channels within said second cell, wherein said unused data channels are grouped into at least a noisy group of unused data channels and a clear group of unused data channels on the basis of said monitored noise signal power;

means for monitoring a received signal power of a first mobile subscriber unit engaged in a call-in progress when said call-in-progress is to be handed off from said first cell into said second cell;

means for comparing said monitored received signal power of said first mobile subscriber unit engaged in a call-in-progress with a first prespecified threshold; and means, responsive to a handoff request from said first cell, for preferentially assigning one of said unused data channels in said second cell to said first mobile subscriber unit where such preference in assigning is to assign a channel such that a signal to noise ratio calculated upon said monitored received signal power and said monitored noise signal power of said preferentially assigned channel meets or exceeds a required signal to noise ratio such that near uniform capacity and quality of data channels within said second cell is ensured, wherein:

said first mobile subscriber unit engaged in a call-in-progress is assigned an unused data channel from said noisy group of unused data channels when said noisy group contains at least one unused data channel and when said first comparing of said monitored received signal power of said first mobile subscriber unit engaged in a call-in-progress indicates said monitored received signal power is greater than said first prespecified threshold; and said first mobile subscriber unit engaged in a call-in-progress is assigned an unused data channel from said clear group of unused data channels when said clear group contains at least one data channel and when said first comparing of said monitored received signal power of said first mobile subscriber unit engaged in a call-in-progress indicates said monitored received signal power is less than said first prespecified threshold.

14. The apparatus of claim 13, wherein said means for monitoring a noise signal power in unused data channels within said second cell further comprises means for ordering said unused data channels based on said noise signal power to facilitate said grouping.

15. The apparatus of claim 14, wherein said means for ordering further comprises means for rank ordering said unused data channels from the most noisy to the least noisy on the basis of said monitored noise signal power.

16. The apparatus of claim 15, wherein said means for preferentially assigning further comprises:

means for calculating one or more signal to noise ratios based upon said monitored received signal power of said first mobile subscriber unit and said rank ordered unused channels; and means for assigning said first mobile subscriber unit engaged in a call-in-progress the noisiest channel, within said rank ordered unused channels, whose said calculated signal to noise ratio meets or exceeds a predetermined signal to noise ratio.

17. The apparatus of claim 15 wherein said means for preferentially assigning further comprises:

means for calculating one or more signal to noise ratios based upon said monitored received signal power of said first mobile subscriber unit and said rank ordered unused channels; and means for assigning said first mobile subscriber unit engaged in a call-in-progress a channel, within said rank ordered unused channels, whose said calculated signal to noise ratio meets or exceeds a predetermined signal to noise ratio.

18. The apparatus of claim 17, further comprising:

means, responsive to a request by a second mobile subscriber unit for access to a channel where said request for access is not a handoff request, for determining whether a number of unused data channels within said second cell has fallen below a prespecified number of channels that have been reserved for handoff;

means, responsive to a determination that said number of unused data channels within said second cell has not fallen below said prespecified number of channels reserved for handoff, comprising:

means for monitoring a received signal power of said second mobile subscriber unit making said request for access to said channel within said second cell; and means for preferentially assigning one of said unused data channels in said second cell to said second mobile subscriber unit where such preference in assigning is to assign a channel such that a signal to noise ratio calculated upon said monitored received signal power and said monitored noise signal power of said preferentially assigned channel meets or exceeds a required signal to noise ratio such that near uniform capacity and quality of data channels within said second cell is ensured.

19. The apparatus of claim 18 wherein said means for preferentially assigning further comprises:

means for calculating one or more signal to noise ratios based upon said monitored received signal power of said second mobile subscriber unit and said rank ordered unused channels; and means for assigning said second mobile subscriber unit engaged in a call-in-progress the noisiest channel, within said rank ordered unused channels, whose said calculated signal to noise ratio meets or exceeds a predetermined signal to noise ratio.

20. The apparatus of claim 18 wherein said means for preferentially assigning further comprises:

means for calculating one or more signal to noise ratios based upon said monitored received signal power of said second mobile subscriber unit and said rank ordered unused channels; and means for assigning said second mobile subscriber unit engaged in a call-in-progress a channel, within said rank ordered unused channels, whose said calculated signal to noise ratio meets or exceeds a predetermined signal to noise ratio.

21. The apparatus of claim 13, further comprising:

means for making a second comparing of said monitored received signal power of said first mobile subscriber unit engaged in a call-in-progress with a second prespecified threshold when said first comparing of said monitored received signal power of said first mobile subscriber unit engaged in a call-in-progress indicates said monitored received signal power is less than or equal to said first prespecified threshold;

means for assigning said first mobile subscriber unit engaged in a call-in-progress an unused data channel from said clear group of unused data channels when said clear group contains at least one unused data channel and when said second comparing of said monitored received signal power of said first mobile subscriber unit engaged in a call-in-progress with a second prespecified threshold indicates that said monitored received signal power of said first mobile subscriber unit engaged in a call-in-progress is greater than or equal to said second prespecified threshold; and means for assigning said first mobile subscriber unit engaged in a call-in-progress an unused data channel from said noisy group of unused data channels when said clear group is empty and when said second comparing of said monitored received signal power of said first mobile subscriber unit engaged in a call-in-progress with a second prespecified threshold indicates that said monitored received signal power of said first mobile subscriber unit engaged in a call-in-progress is greater than or equal to said second prespecified threshold.

22. The apparatus of claim 13, further comprising:

means, responsive to a request by a second mobile subscriber unit for access to a channel where said request for access is not a handoff request, for determining whether a number of unused data channels within said second cell has fallen below a prespecified number of channels that have been reserved for handoff;

means, responsive to a determination that said number of unused data channels within said second cell has not fallen below said prespecified number of channels reserved for handoff, comprising:

means for monitoring a received signal power of a second mobile subscriber unit making said request for access to said channel within said second cell;

means for preferentially assigning one of said unused data channels in said second cell to said second mobile subscriber unit where such preference in assigning is to assign a channel such that a signal to noise ratio calculated upon said monitored received signal power and said monitored noise signal power of said preferentially assigned channel meets or exceeds a required signal to noise ratio such that near uniform capacity and quality of data channels within said second cell is ensured.

23. The apparatus of claim 22, wherein said means for preferentially assigning further comprises:

means for making a first comparing of said monitored received signal power of said second mobile subscriber unit making said request for access with a first prespecified threshold;

means for assigning said second mobile subscriber unit making said request for access an unused data channel from said noisy group of unused data channels when said noisy group contains at least one unused data channel and when said first comparing of said monitored received signal power of said second mobile subscriber unit making said request for access indicates said monitored received signal power is greater than said first prespecified threshold; and means for assigning said second mobile subscriber unit making said request for access an unused data channel from said clear group of unused data channels when said noisy group is empty and when said first comparing of said monitored received signal power of said second mobile subscriber unit making said request for access indicates said monitored received signal power is greater than said first prespecified threshold.

24. The apparatus of claim 23, further comprising:

means for making a second comparing of said monitored received signal power of said second mobile subscriber unit making said request for access with a second prespecified threshold when said first comparing of said monitored received signal power of said second mobile subscriber unit making said request for access indicates said monitored received signal power is greater than said first prespecified threshold;

means for assigning said second mobile subscriber unit making said request for access an unused data channel from said clear group of unused data channels when said second comparing of said monitored received signal power of said second mobile subscriber unit making said request for access with a second prespecified threshold indicates that said monitored received signal power of said second mobile subscriber unit making said request for access is less than said second prespecified threshold;

means for assigning said second mobile subscriber unit making said request for access an unused data channel from said clear group of unused data channels when said clear group contains at least one unused data channel and when said second comparing of said monitored received signal power of said second mobile subscriber unit making said request for access with a second prespecified threshold indicates that said monitored received signal power of said second mobile subscriber unit making said request for access is greater than or equal to said second prespecified threshold; and means for assigning said second mobile subscriber unit making said request for access an unused data channel from said noisy group of unused data channels when said clear group is empty and when said second comparing of said monitored received signal power of said second mobile subscriber unit making said request for access with a second prespecified threshold indicates that said monitored received signal power of said second mobile subscriber unit making said request for access is greater than or equal to said second prespecified threshold.

* * * * *